United States Patent [19]

Davis

[11] Patent Number: 5,168,652
[45] Date of Patent: Dec. 8, 1992

[54] LINE TIE FOR ARTIFICIAL FISH LURE

[75] Inventor: Jack E. Davis, Crescent City, Fla.

[73] Assignee: Mann's Bait Company, Inc., Eufaula, Ala.

[21] Appl. No.: 702,501

[22] Filed: May 20, 1991

[51] Int. Cl.⁵ .............................................. A01K 85/00
[52] U.S. Cl. ................................. 43/42.23; 43/42.49
[58] Field of Search ................. 43/42.02, 42.23, 42.08, 43/42.09, 24

[56] References Cited

U.S. PATENT DOCUMENTS

| | | | |
|---|---|---|---|
| 676,554 | 6/1901 | Friedlander | 43/24 |
| 743,546 | 11/1903 | Nix . | |
| 1,313,567 | 8/1919 | Ulrich . | |
| 1,333,154 | 3/1920 | Buddle | 43/42.23 |
| 2,618,096 | 11/1952 | Wagner | 43/42.23 |
| 2,663,963 | 12/1953 | Russell | 43/42.02 |
| 2,753,649 | 7/1956 | Sporket | 43/42.5 |
| 2,976,642 | 3/1961 | Wickman et al. | 43/43.13 |
| 3,613,290 | 10/1971 | Louthan | 43/43.13 |
| 3,702,514 | 11/1972 | Donato | 43/24 |
| 3,959,060 | 5/1976 | Jones | 156/245 |
| 3,979,853 | 9/1976 | Storm et al. | 43/42.29 |
| 4,006,552 | 2/1977 | Cunningham | 43/42.48 |
| 4,807,388 | 2/1989 | Cribb | 43/42.23 |

FOREIGN PATENT DOCUMENTS 313692 8/1969 Sweden ..................................... 43/24

Primary Examiner—Kurt C. Rowan
Attorney, Agent, or Firm—Bacon & Thomas

[57] ABSTRACT

An artificial fish lure includes a wire form line tie that includes a central upwardly arched portion connecting a downwardly extending leg portion or portions, and arm elements extending longitudinally from the bottom of the leg portions. The arch and leg portions of the wire form project through an elongated longitudinal slot in the top surface of the lure and the fishing line is secured to the upper closed end of the line tie. The slot in the line is tapered so that it is wider at the top than at the bottom, and the longitudinally extending arms are confined in a channel at the bottom of the slot so that the line tie can pivot laterally about the arms to enable the lure to pivot or rock from side to side as it is drawn through the water during retrieval. In one embodiment, the slot includes a forward edge that tends to hold the line tie like a detent in a centralized position when the fishing line initially pulls on the lure until the lure has dived beneath the surface of the water to a desired extent. The diving action frees the line tie from the front edge of the slot so that the lure is then free to rock from side to side within the limits of the tapered sidewalls of the slot.

16 Claims, 3 Drawing Sheets

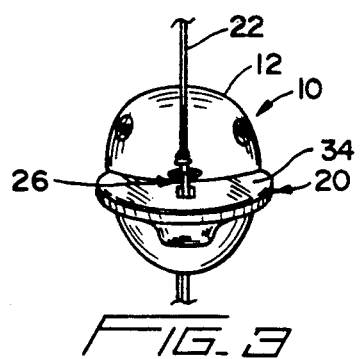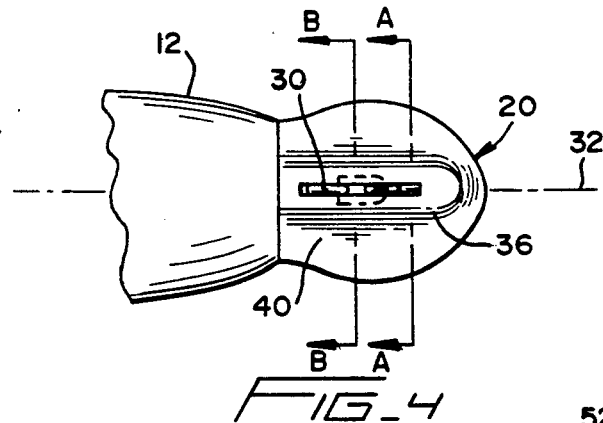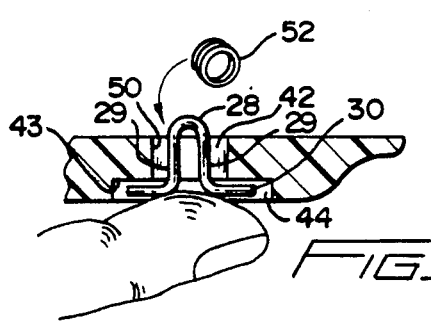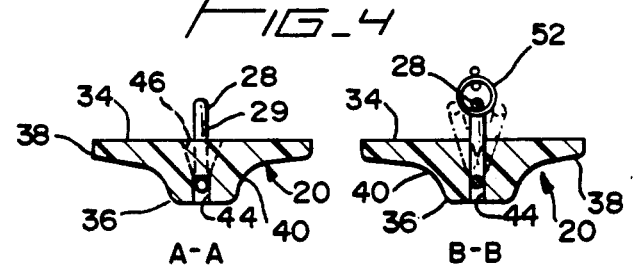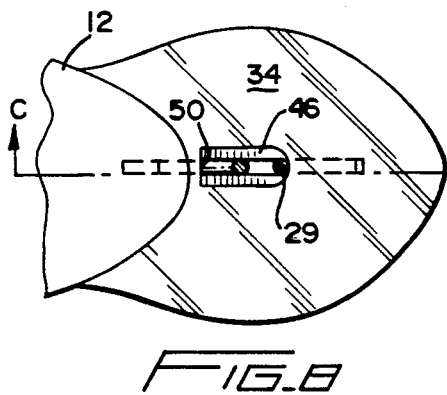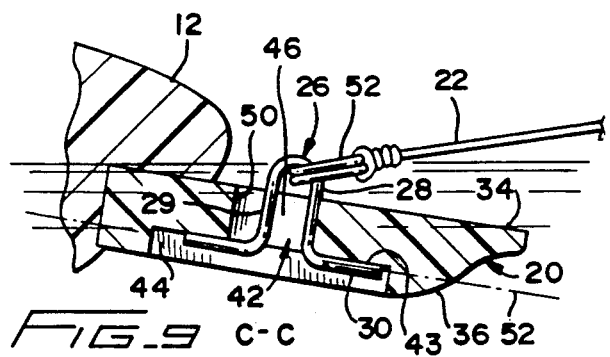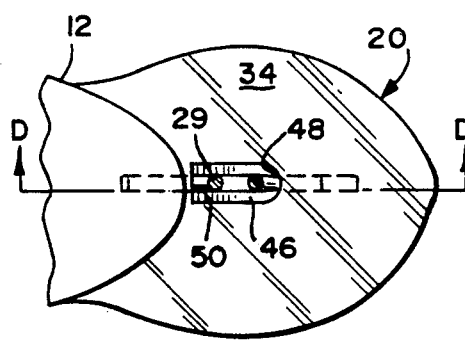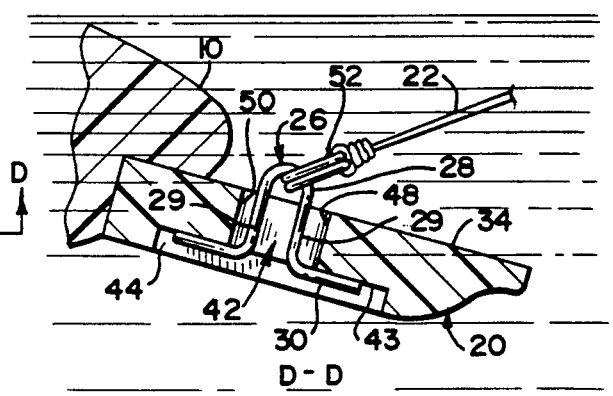

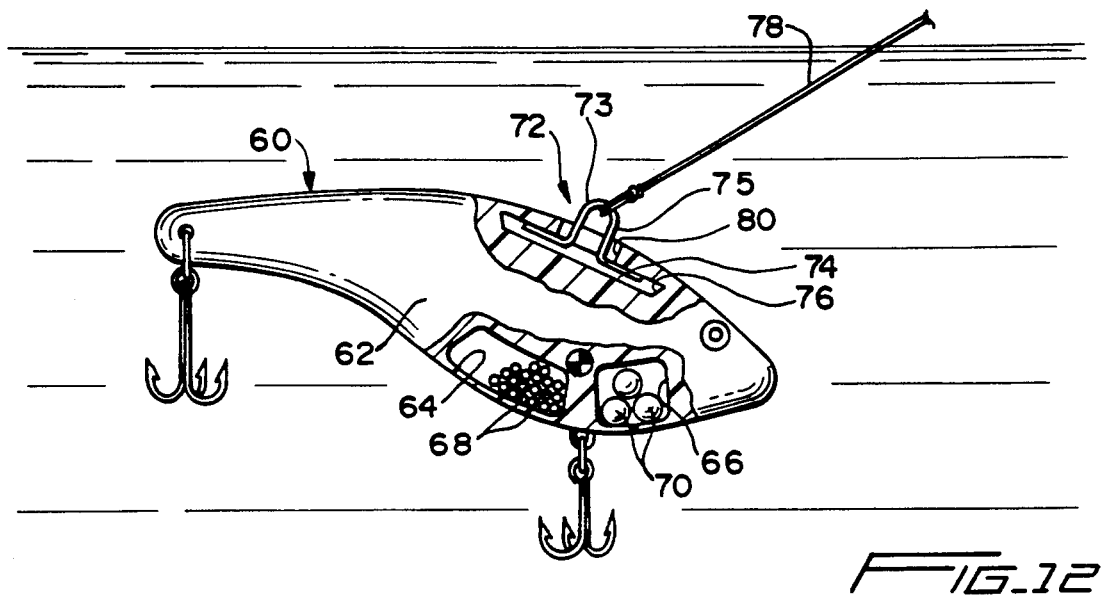
FIG_12
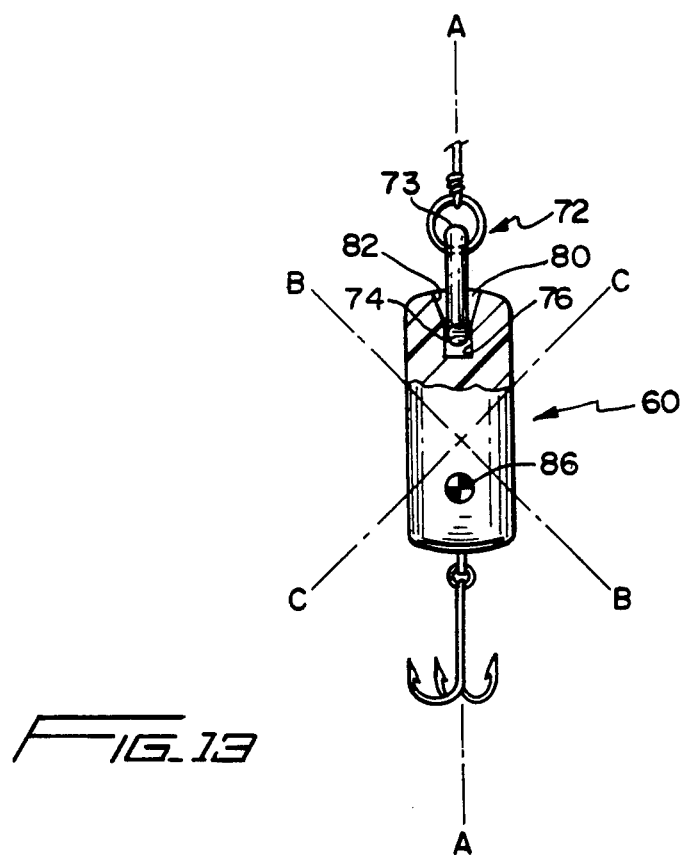
FIG_13

LINE TIE FOR ARTIFICIAL FISH LURE

FIELD OF THE INVENTION

The present invention relates to artificial fish lures and in particular a line tie arrangement for such lures.

BACKGROUND OF THE INVENTION

Artificial fish lures designed as facsimiles of live bait must be provided with a line tie for securing a fishing line to the lure. In accordance with the prior art, the line tie is typically an eyelet or ring fixedly mounted in the upper or forward section of the lure, depending upon the type of lure and the action expected of the lure while being retrieved in water. The fishing line is secured to the line tie by a simple knot or similar arrangement, sometimes using an intermediate fastening ring between the line and the line tie.

Prior art line ties, while simple and relatively inexpensive, nevertheless must be designed to be firmly attached to molded plastic material from which most modern artificial lures are constructed. Usually, the line tie for the lure is simply embedded in the plastic during molding, although the line tie can be driven, screwed or otherwise firmly anchored in the fish lure material by any suitable arrangement. A disadvantage, however, of typical prior art arrangements is that the line tie element itself is rigidly secured to the lure body and does not contribute to the action of the lure while being retrieved in water. In fact, most prior art line ties virtually inhibit some action of the lure in water since the lure does not have true freedom of movement relative to the line tie. Thus, prior art line ties either permit uncontrolled movement of the lure or inhibit desirable lure action due to their construction and anchoring arrangement on the lure.

It is highly desirable to provide a line tie connection between a fishing line and an artificial lure that is simple to fabricate, does not require a threaded or driven fastener element, permits relative rocking movement of the lure about its longitudinal axis at its point of connection between the lure and the line tie and which otherwise satisfies all expectations of a line tie for an artificial lure.

BRIEF SUMMARY OF THE INVENTION

The present invention overcomes disadvantages associated with prior art line tie systems for artificial lures by providing a line tie that is connected to the body of the lure so as to permit relative pivotal or rolling movement of the body of the lure about the lure longitudinal axis while the lure is retrieved at the end of the fishing line. The present invention is also intended to provide a line tie for an artificial lure having a forwardly extending diving lip including a means for securing the line tie on the diving lip in such a manner that startup action of the lure is optimized in a straight line path along the axis of the lure.

In accordance with a preferred embodiment of the invention, a line tie for an artificial lure comprises a bent wire form including a centrally upwardly extending arch portion connected between downwardly extending leg portions, with opposed arms extending outwardly from and in substantially aligned relationship with the arch and leg portions. When installed, the arms of the bent wire form are in alignment with the lure longitudinal axis, with the upwardly extending arch connected to the fishing line. The opposed arms of the wire form are secured interiorly and beneath the surface of the body of the lure with the arch extending upwardly through a slot in the lure body having a width greater than the width of the wire form. The opposed arms of the wire form are disposed in a groove within the lure body such that the wire form can pivot from side to side about an imaginary axis extending through the arms, with the slot in the lure body accommodating the side to side movement of the arch and by portions of the wire form.

Accordingly, when a fishing line is secured to the arch of the wire form, pulling forces from the fishing line are reacted back to the arms of the wire form disposed interiorly and beneath the surface of the lure and the lure can rock (i.e., roll) from side to side about its longitudinal axis up to the full slot width that accommodates the arch and leg portions of the wire form without interference with the line tie. Rapid back and forth rocking movement of the lure relative to the line tie is thus facilitated. In lures having a rattle arrangement within them, this enhances the rattling action and the consequent noise generated by the lure while it is retrieved in water.

In the case of a lure having a diving lip, the wire form line tie in accordance with this invention extends upwardly through a slot in the upper surface of the diving lip, with the longitudinally extending arms of the line tie disposed in a slot beneath the surface of the diving lip. In this embodiment, the wire form may be retained in the diving lip simply by extending the arch upwardly through the slot and securing it there by means of a wire ring or the like having a width greater than the slot. Assembly of such a line tie is made extremely simple in accordance with this embodiment of the invention.

The slot in the lure body that receives the arch portion of the line tie is configured so as to taper inwardly from the top of the slot to the bottom thereof for accommodating side to side motion of the line tie as it pivots about its arms located at the bottom of the slot. In the case of an artificial lure having a diving lip, the slot may include a forward edge that is curved to match the outer diameter of the line tie wire form so that, upon initiation of retrieval of the lure, forward pressure of the wire form against the front edge of the slot tends to keep the lure level and from rocking side to side about its longitudinal axis, and thereby stabilizes the initial diving action of the lure. As the lure dives deeper, the configuration of the slot is such that the line tie can move rearwardly away from the front edge of the slot to free up the line tie relative to the front edge of the slot so that desirable side to side rocking motion of the lure is facilitated.

BRIEF DESCRIPTION OF THE DRAWINGS

With reference to the appended drawings:

FIG. 3 shows a front elevation view of the lure shown in FIG. 1;

FIG. 4 is a bottom view of the lure shown in FIG. 1;

FIG. 5 is a section view taken along line A—A in FIG. 4;

FIG. 6 is a section view taken along line B—B in FIG. 4;

FIG. 7 is a schematic illustration of how the line tie is assembled to the lure of FIG. 1 in accordance with the invention;

FIG. 8 is an enlarged detail view of the top of the diving lip of the lure shown in FIG. 1 with the wire form line tie at a forward position;

FIG. 9 is an enlarged detailed view taken along line C—C in FIG. 8;

FIG. 10 is an enlarged detailed view of the top of the diving lip of the lure shown in FIG. 1 with the wire form line tie at a rearward position;

FIG. 11 is an enlarged detailed view taken along line D—D in FIG. 10;

FIG. 12 illustrates another embodiment of the invention wherein the line tie is secured to the body of an artificial lure not provided with a diving lip; and FIG. 13 is a front view of the lure illustrated in FIG. 12.

DETAILED DESCRIPTION OF PREFERRED EMBODIMENTS

Figure 1:
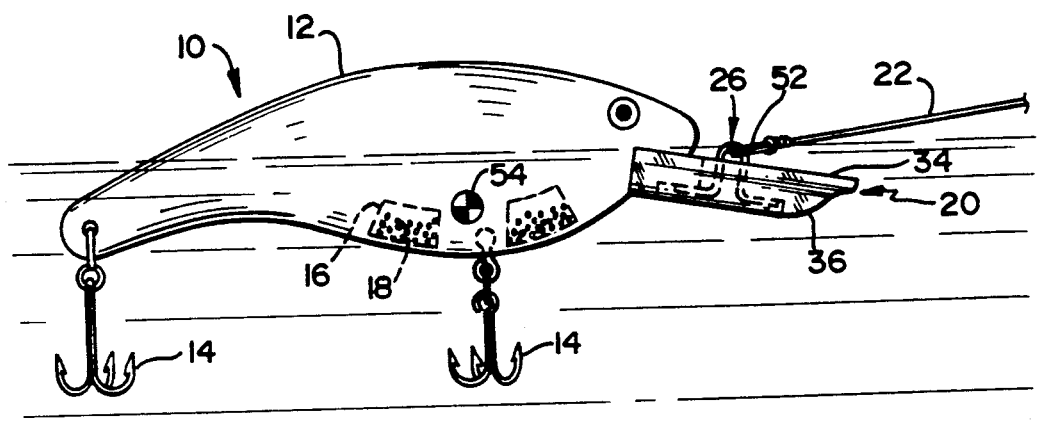
FIG. 1 shows a side elevation view of an artificial fish lure including a diving lip and line tie embodying the invention.
Figure 1A:
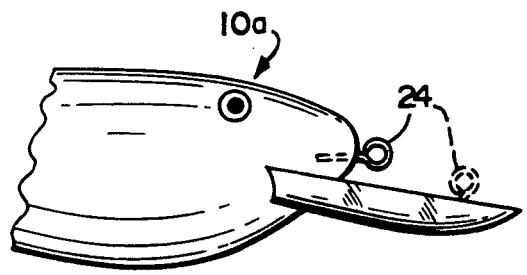
FIG. 1a shows a lure constructed in accordance with the prior art.

With reference to FIGS. 1 and 1a, an artificial fish lure constructed in accordance with one embodiment of the invention is generally illustrated at 10 and includes a body portion 12 to which are attached fish hook elements 14 in accordance with known practice. The body portion 12 can be formed in accordance with known technology from synthetic plastic materials and can be molded, or assembled from molded sections cast to resemble the body portion of live bait (i.e., a minnow) or other representational configuration. Preferably, an interior cavity or chamber 16 is provided near the lower side of the lure and contains small beads or birdshot (i.e. 0.040-0.080 in. dia.) to provide a loose ballast weight for the lure as well as a noise source to enhance the attention getting characteristic of the lure during its use by a fisherman. The loose birdshot does not act like a solid ballast weight, since each pellet is free to move in accordance with inertia or other forces acting thereon within a chamber that is larger than the collective size of the birdshot pellets, and it is believed that the moment of inertia of the lure about its rolling axis is optimized with the small birdshot loosely contained in the chamber 16; that is, the lure rolls or pivots from side to side quicker, but in a dampened fashion.

The lure 10 includes a diving lip 20 constituting part of the body portion at its forward end that is sloped slightly downwardly from the surface of the water when the lure is in its natural floating position. As is well known, such diving lips actually function as a diving plane for the lure and react against the water in which the lure is immersed to cause the lure to dive beneath the surface of the water and to exhibit motion characteristics that resemble live bait.

The present invention involves the line tie arrangement for securing a fishing line 22 to the body of the lure. In accordance with the prior art, as shown in FIG. 1a, line ties typically take the form of a threaded screw eyelet 24 as shown at the nose portion of the lure 10a or (in hidden lines) on the diving lip itself. These eyelets are simple in construction, but require a threaded or driven connection into the material of the lure that involves some labor or automated equipment capable of securing the eyelet into the lure body or lip. Since modern lures are frequently constructed of substantially dense and rigid plastic, screwing an eyelet into the body of the lure or of the diving lip of same is somewhat difficult and typically requires drilling of a pilot hole for receiving the threaded end of the eyelet. A greater disadvantage of the prior art construction is that the eyelet is fixed in position on the lure and does not itself facilitate any side to side action of the lure aside from the action obtained from the reaction of the diving lip and the lure itself to the surrounding body of water and the reaction of the fishing line at its point of attachment to the line tie. The present invention is intended to constitute an improvement over prior art line ties that enhances the action of the lure in water and which is also extremely simple to assemble without drilling pilot holes for the line tie eyelet or otherwise threading or driving an eyelet into the lure body material.

Figure 2:
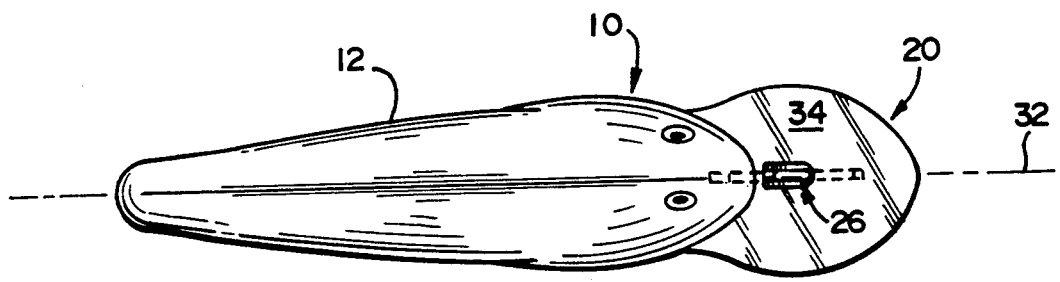
FIG. 2 shows a plan view of the lure shown in FIG. 1.

Referring again to FIG. 1, the line tie constructed in accordance with this invention preferably is a bent wire form 26 that is assembled to the diving lip 20 of the lure in a very simple manner as will be described below with reference to FIG. 7 of the drawings. The wire form 26 comprises an upwardly extending inverted "U" or arch shaped central portion 28 (see FIG. 9) generally referred to as an upwardly extending arch portion, with the arch portion connecting depending leg portions 29 and a pair of anchoring arms 30 extending outwardly from the bottoms of legs 29 in a plane that includes the arch portion 28, legs 29 and the longitudinal axis 32 (see FIG. 2) of the lure. The longitudinal axis 32, of course, generally corresponds with the longitudinal axis of symmetry of the lure, although this is not necessarily the case in every instance. In the example illustrated, axis 32 extends along the longitudinal plane of symmetry of the lure body 12 and the diving lip 20.

In the embodiment thus far described, the diving lip 20 includes a top surface 34 and a bottom area 36. As seen in cross section in FIGS. 5 and 6, the diving lip 20 includes a relatively narrow top peripheral edge area 38, a relatively narrow profile bottom area 36 and sidewalls including concave portions 40 connecting the top side edge areas and the bottom area 36.

An elongated slot 42 extends from the top to the bottom of the diving lip and has length, height and width dimensions so as to freely receive the central arch or inverted "U" portion of the wire form line tie as seen, for example, in FIGS. 7 and 9. Preferably, the length of the slot along the longitudinal axis 32 is longer than the central inverted "U" portion of the line tie to allow some forward and rearward free movement of the line tie within the slot 42 for reasons that will be explained below.

A longitudinally extending channel 44 is provided in the lower portion of the diving lip 20 and is arranged to freely receive the outwardly extending arms 30 of the line tie as seen in FIGS. 5 and 7. The channel 44, it will be noted, confines the outwardly extending arms 30 in a lateral sense with respect to the longitudinal axis 30, while allowing free pivotal movement of the line tie from side to side about an imaginary pivot axis 52 extending through the arms 30, as schematically illustrated in FIG. 6, in a manner to be discussed in more detail below. The channel 44 thus acts like a bearing bushing for the arms 30, which function in the manner of a pivot interiorly of the lip 20.

As shown in FIGS. 5 and 6, the sidewalls 46 of the slot 42 are tapered such that they diverge outwardly between the bottom of the slot and the top surface 34 of the diving lip. Moreover, in accordance with this embodiment, the forward closed end 48 of the slot is configured to match the exterior diameter of the line tie 26, which is circular in cross section in the preferred embodiment. To repeat a point made earlier, the total length of the slot 42 is longer in the longitudinal direction than the central inverted "U" portion of the line tie, so that the line tie can move from a forwardmost position at which the forward leg of the inverted "U" is in direct engagement with the front end 48 of the slot to a rearward position at which the opposite leg of the central inverted "U" engages the rear end 50 of the slot 42. The length of the channel 44, of course, would be dimensioned to accommodate this longitudinal movement of the wire form line tie 26.

It will thus be seen that, with reference to FIGS. 4, 5 and 6, the line tie 26 can pivot side to side about an imaginary pivot axis 52 (see FIG. 9) extending through the arms 30, with the side to side motion fully accommodated by the sloping sidewalls 46 of the slot 42. The arms 30, of course, are retained against upward motion by the upper surface 43 of channel 44. In the embodiment described thus far, when the fishing line 22 pulls forwardly on the line tie 26, the forward leg of the central inverted "U" portion of the line tie will engage the corresponding circular front edge 48 of the slot 42 for reasons to be explained momentarily. As the lure dives to a deeper depth in the water as a result of the retrieval motion of the fish line 22 and the reaction of the diving lip 20 to the water, the angle of pulling force exerted by line 22 upon the line tie 26 will increase to cause the line tie 26 to back away slightly from the circular front edge 48 of the slot 42. With the forward leg of the central "U" portion of the line tie pressed against the front edge 48 of the slot 42, the "U" portion of the line tie will be held in its central position as seen in FIG. 5 by the detent relationship between the "U" portion and the front edge 48 of the slot 42. As the central "U" portion of the line tie moves away from the front edge 48 of the slot 42, the detent relationship is released and the line tie is free to pivot relative to the diving lip 20 as shown in FIG. 6. Actually, the line tie tends to stay in a centralized position while the lip 20 and the lure 10 pivot or roll in a side to side motion from the reaction of the water on the lip 20.

Assembly of the line tie 26 to the lure embodiment already described is carried out in a manner illustrated in FIG. 7. After the diving lip 20 has been formed with the slot 42 and channel 44, wire form line tie as described is inserted upwardly so that the central inverted "U" portion extends through and beyond the slot 42, with the top of the inverted "U" preferably projecting beyond the top surface 34 of the diving lip 20. A simple split ring 52, loop, or other appropriate element that can serve as a simple connection to a fishing line is then placed so that it extends under the central inverted "U" portion of the line tie to prevent the line tie element from falling back through the slot. Even a large knot in a fishing line could effectively function here. The effective width of the split ring 52 or any other equivalent element is greater than the effective width of the slot 42 to prevent withdrawal of the line tie 26 back through the slot opening 42. A fishing line 22, of course, can then simply be threaded through the split ring 52 in any convenient manner.

In operation, the lure 10 in accordance with a first embodiment of the invention is cast by a fisherman or otherwise placed in position on the surface of a body of water as shown in FIG. 1, with a fishing line 22 attached thereto at the line tie 26 via the ring element 52. The lure will be in position approximately as shown in FIG. 1 due to the balance between buoyancy and internal weights, so that retrieval force on the lure exerted by line 22 will cause forward motion of the lure 10, whereupon the diving lip 20 will almost immediately cause the lure to dive beneath the surface of the body of water in which it is floating. Initially, the angle between the fishing line and the top surface 34 of the diving lip is relatively small so that the force of the fishing line causes the forwardmost leg 29 of the line tie 26 to fit snugly in a detent relationship against the front end of the slot 42, as shown in FIG. 9. This will tend to cause the line tie 26 to center itself in the slot 42 due to the snug fitting relationship between the forward leg 29 and the front edge of the slot 42. This detent relationship tends to keep the line tie centered in the tapered slot 42 during the initial part of the diving action and prevents the lure from erratically hunting from side to side during the initial part of retrieval of the lure. However, as the angle of the diving lure increases upon its forward motion in the water, the angle between the top of the diving lip 34 and the fishing line 22 increases, as seen in FIG. 11, which tends to move the line tie 26 rearwardly within the slot 42. Since the front leg 29 portion of the line tie 26 no longer fits snugly against the front edge 48 of the slot 42, as seen in FIG. 11, the line tie 26 is free to move laterally from side to side in a pivotal motion within the slot 42, about an imaginary pivot axis 52 essentially extending through outwardly extending arms 30, as shown in FIG. 9. Actually, the lure 10 pivots about axis 52 as the line tie 26 transmits the pulling force from fishing line 22 to the upper wall 43 of the channel 44. The lure, in a very natural manner, is able to pivot laterally about axis 52 with enhanced freedom of motion as compared with prior art line ties as shown in FIG. 1a. However, the side to side motion is not completely unconstrained, since the sloping sides 46 of the slot 42 tend to hold the magnitude of the transverse pivotal action of the lure within limits so that it does not pivot widely in an unnatural manner.

Accordingly, upon initial retrieval of the lure, the lure according to this embodiment tends to dive straight without erratic side to side motion due to the detent centering action between the forward leg portion of the line tie and the forward curved end of the slot 42. Shortly thereafter, as the angle of the diving lip 20 relative to the fishing line increases, the line tie backs away from the forward edge of the slot 42 to free up the lure for relative pivotal movement from side to side with respect to the line tie within limits essentially established by the sloping sidewalls 46 of the slot 42. This enhances the action of the lure and is believed to create a more natural motion of the lure in water.

It is to be noted that the outwardly extending arms 30 of the wire form line tie 26 effectively pull the lure through the water from beneath the diving lip, a desirable position with respect to the center of gravity (C.G.) 54 of the lure. It is believed that this pulling action from a low position on the lure further enhances its stability and action in the water as compared with prior art line ties as shown in FIG. 1a, where the pulling action of the fishing line is directed relatively high on the lure.

The line tie 26, it will be noted, distributes the pulling force of the fishing line over a relatively wide bearing area within the lure, considering the area of contact between the outward arms 30 and the upper wall 43 of channel 44, and the slot side and front walls, thereby providing a strong connection.

In accordance with an alternate embodiment of the invention illustrated in FIG. 12, an artificial lure 60 without a diving lip is illustrated and includes a central body portion 62 having chambers 64, 66 containing, respectively, small metal rattle beads or birdshot 68 loosely contained in their chamber 64 and metal ballast weights 70 contained in their chamber 66. The small metal balls 68 provide a rattle effect for the lure, while the weights 70 provide a ballast for the lure so that it floats perpendicular from the fishing line and moves in a stabilized fashion when retrieved.

The lure 60 is provided with a line tie 72 similar to line tie 26 illustrated in connection with the embodiment shown in FIG. 1 described above. In this instance, line tie 72 likewise preferably constitutes a single bent wire form 72 having an upwardly extending arch portion 13 connecting a pair of leg portions 75 and a pair of axially extending arms 74 connected to the leg portions corresponding to similar elements described previously in connection with line tie 26. However, the arms 74 of the line tie 72 are disposed in an enclosed chamber 76 that is configured such that the arch portion 72 is always maintained above the upper surface of the lure 60 for attachment to a fishing line 78.

As seen in FIG. 13, the chamber 76 is slightly larger than the arms 74 of the line tie 72 and communicates with an upwardly extending slot 80 corresponding to slot 42 in the embodiment of the artificial lure illustrated in FIG. 1 and described previously. As seen in FIG. 13, the side walls 82 of the slot 80 are tapered inwardly from the outer surface of the lure towards the top of chamber 74 and the length of the slot 80 and the chamber 76 accomodate some longitudinal movement of the line tie 72. In accordance with this embodiment, self-centering of the lure during initial retrieval by forming the forward end of the slot 80 in a rounded configuration is not necessarily required so the forward end of the slot 80 may be left blunt or any other desired shape.

In use, the artificial lure in accordance with the embodiment illustrated in FIGS. 12 and 13 will initially be cast into the water and will immediately begin to sink due to the ballast weights 70 and the negative buoyancy contributed by the rattle balls 68, assuming the latter are formed of metal. While sinking, the relationship between the center of gravity (C.G.) 86 of the lure, its center of buoyancy, and the line tends to cause the lure to sink in an upright natural position. When the lure has reached a desired depth, retrieval begins by applying tension to the fishing line 78 by the fisherman. The lure will begin to roll from side to side about its longitudinal axis due to influences of the various forces acting on the lure body, which now may be considered as suspended from the line tie 72, with all retrieval forces being concentrated at the axial arms 74 of the line tie. As illustrated in FIG. 13, rolling action of the lure about its longitudinal axis will cause the lure to pivot (i.e., roll) rapidly between axes A—A, B—B and C—C illustrated in FIG. 13, which are shown only for illustrative purposes. The angle of travel generally will be considerably less than illustrated by Axes B—B and C—C in FIG. 13. The slot sidewalls 82 freely accommodate this side to side rocking action of the lure body without substantial interference from the fishing line 78 and the line tie device 72. The lure therefore can react to the slip stream in a natural manner while generating a vigorous rattle due to the rattle elements 68 in chamber 64. Thus, the wire form line tie 72 arranged in the tapered slot 82 with axial arms 74 disposed beneath the upper surface of the lure body all contributes to enhanced rocking motion of the lure when being retrieved in water without necessitating any tuning of the connection between the line tie and the lure body.

It will thus be seen that a novel system has been described for attaching a fishing lure to a fishing line using a wire form element assembled to the lure in a simple, low cost manner. The line tie furthermore produces enhanced action of the lure in water and a strong connection between the fishing line and lure.

It will be evident that various modifications can be made to the preferred embodiments without departing from the spirit and scope of the invention which is defined in the claims appearing below. For example, the specific dimensions and proportions of elements illustrated can be modified within the skill of a person knowledgeable in the art of making artificial fishing lures, and the various materials described also can be modified in accordance with known practice. While a channel 44 has been illustrated for receiving the outwardly extending arms 30 of the line tie, any appropriate bushing arrangement could be utilized for maintaining the arms in longitudinal alignment with the axis of the lure. In addition, the particular slope of the sidewalls of the slot 42 could be modified in accordance with various characteristics desired for different lures. In addition, while an inverted "U" central portion has been specifically described, it is intended that this description be interpreted to include any closed end configuration, including any curved form or other configuration that could provide a closed end of a wire form capable of receiving an appropriate ring or other equivalent element to prevent the wire form from slipping back out of its position within the slot 42. For example, the upper end of the wire form that engages the fishing line could be in the form of an inverted "V", or could be elliptical in shape if desired. The use of the descriptive term "inverted 'U'" to describe the central portion of the wire form line tie is not intended to be a limiting description but is used simply as a matter of convenience. Moreover, while a pair of leg portions 29 are illustrated, a single leg could be used with an appropriate arch portion and an appropriate anchoring arm or equivalent portion disposed within the chamber in the lure in accordance with the teachings of this invention.

I claim:

1. In an artificial fish lure including a longitudinal axis, a line tie and a body portion having an outer surface, the improvement comprising:

said line tie comprising a bent wire form including a central upwardly extending arch portion connected to downwardly extending leg portions, and opposed arms extending outwardly from and in substantially aligned relationship with the arch and leg portions;

said outer surface including an open slot extending into the body portion and longitudinally along the lure body portion said slot including side walls converging inwardly from the top to the bottom of the slot, and said wire form being mounted in the slot for transverse pivotal movement about an imaginary longitudinal pivot axis extending through said outwardly extending arms;

said wire form disposed in said slot such that the leg portions project through the slot to a position whereat the arch portion is disposed adjacent the outer surface of the body portion with the arms disposed adjacent the bottom of the slot and extending longitudinally along the lure body;

said slot having a width greater than the thickness of said leg portions extending through the slot whereby the leg portions may move laterally within the slot; and means for retaining the wire form from withdrawal through the slot.

2. An artificial fish lure as claimed in claim 1, wherein said slot is longer than the exterior length of the wire form in a direction along the lure longitudinal axis, and the wire form is slidably mounted in the slot for longitudinal movement between the opposite slot ends.

3. An artificial fish lure as claimed in claim 2, wherein at least the forwardmost leg portion of said wire form is circular in cross section, and said slot includes a forward closed end corresponding in curvature to the wire form diameter.

4. An artificial fish lure as claimed in claim 1, wherein said slot includes a forward closed end and wherein at least the forwardmost leg portion of the wire form and said closed end are formed in complementary shapes so that their direct engagement with each other results in a detent relationship between them with respect to relative lateral movement between the wire form and the diving lip.

5. An artificial fish lure as claimed in claim 1, including a longitudinal channel in the body portion intersecting the lower end of the slot, said opposed arms of said wire form pivotally disposed in said channel.

6. An artificial lure as claimed in claim 1, wherein said means for retaining the wire form from withdrawal through the slot comprises a means engaging the arch portion of the wire form, said engaging means having an effective width that is greater than the slot effective width.

7. An artificial fish lure as claimed in claim 6, wherein said engaging means comprises a line tie loop element.

8. An artificial fish lure as claimed in claim 1, said body portion including a forwardly extending diving lip, said diving lip having side edge areas and a central section, and connecting surfaces extending between the side edge areas and said central section, said central section being thicker than the side edge areas and said connecting surfaces at least in part being concave in curvature.

9. An artificial fish lure as claimed in claim 1 including an interior chamber in the bottom central area of the lure, and small size birdshot loosely contained in the chamber.

10. In an artificial lure including a longitudinal axis, a line tie and a body portion having an upper surface, the improvement comprising:

said line tie comprising a wire form including an upwardly extending line engaging arched portion, at least one depending leg portion and an anchoring portion connected to the bottom of said at least one leg portion;

said body portion including a chamber for receiving the anchoring portion and a slot extending from the chamber to the exterior of the lure, said anchoring portion of said line tie pivotally mounted and anchored against withdrawal in the chamber with said leg portion extending through the slot with the arched portion exposed for connection to a line;

said slot being tapered inwardly between the outer side of the lure and said chamber and having a width larger than said leg portion so as to be configured to permit free lateral pivotal movement of said leg portion within the slot within the confines of the slot walls.

11. An artificial lure as claimed in claim 10, said slot having a forward edge configured to be complementary with the exterior contour of said leg portion, and said leg portion mounted so as to be movable towards and into engagement with said slot forward edge to provide a detent effect between the leg portion and the slot forward edge.

12. An artificial lure as claimed in claim 10, including a pair of dependent leg portions connected by said arched portion, and an arm portion extending outward from each leg portion, each arm portion extending along the lure length, with the arms constituting said anchoring portion.

13. An artificial lure as claimed in claim 10, said slot having a length greater than the distance spanning the exterior of the leg portion in a direction along the lure longitudinal axis, whereby said line tie can move longitudinally within the slot.

14. An artificial lure as claimed in claim 10, including a cavity in the lower part of the lure body and rattle beads in said cavity.

15. In an artificial fish lure including a longitudinal axis, a line tie and a body portion having an outer surface, the improvement comprising:

said line tie comprising a bent wire form including a central upwardly extending arch portion connected to downwardly extending leg portions, and opposed arms extending outwardly from and in substantially aligned relationship with the arch and leg portions;

said outer surface including an open slot extending into the body portion and longitudinally along the lure body portion;

said wire form disposed in said slot such that the leg portions project through the slot to a position whereat the arch portion is disposed adjacent the outer surface of the body portion with the arms disposed adjacent the bottom of the slot and extending longitudinally along the lure body;

said slot having a width greater than the thickness of said leg portions extending through the slot whereby the leg portions may move laterally within the slot and wherein said slot includes a forward closed end and wherein at least a forwardmost leg portion of the wire form and said closed end are formed in complementary shapes so that their direct engagement with each other results in a detent relationship between them with respect to relative lateral movement between the wire form and the diving lip; and means for retaining the wire form from withdrawal through the slot.

16. In an artificial fish lure including a longitudinal axis, a line tie and a body portion having an outer surface, the improvement comprising:

said line tie comprising a bent wire form including a central upwardly extending arch portion connected to downwardly extending leg portions, and opposed arms extending outwardly from and in substantially aligned relationship with the arch and leg portions;

said outer surface including an open slot extending into the body portion and longitudinally along the lure body portion;

said wire form disposed in said slot such that the leg portions project through the slot to a position whereat the arch portion is disposed adjacent the outer surface of the body portion with the arms disposed adjacent the bottom of the slot and extending longitudinally along the lure body;

said slot having a width greater than the thickness of said leg portions extending through the slot whereby the leg portions may move laterally within the slot; and means for retaining the wire form from withdrawal through the slot, including a longitudinal channel in the body portion intersecting the lower end of the slot, said opposed arms of said wire form pivotally disposed in said channel.

* * * * *